UNITED STATES PATENT OFFICE.

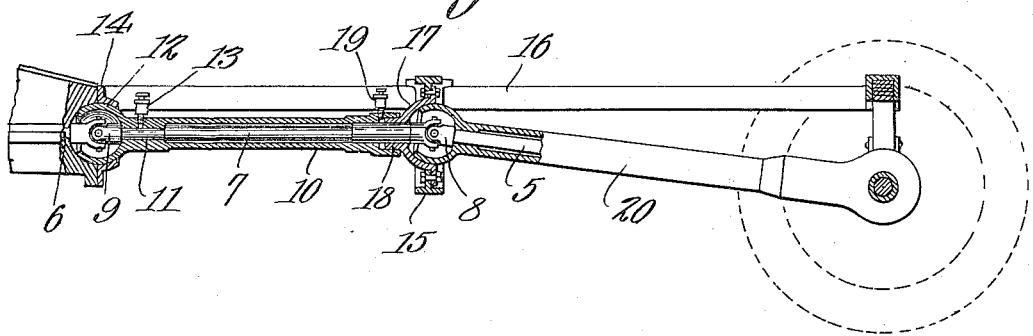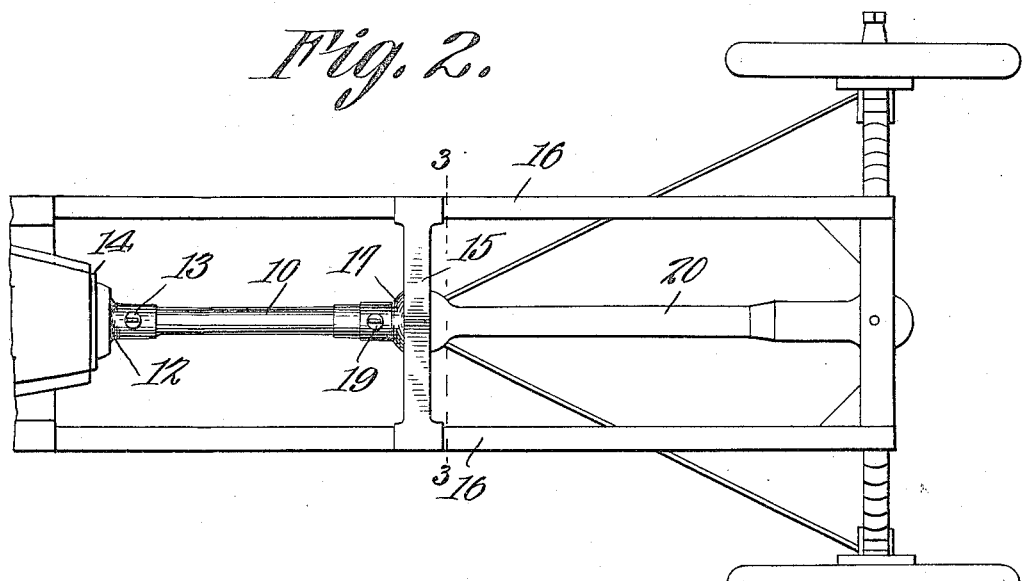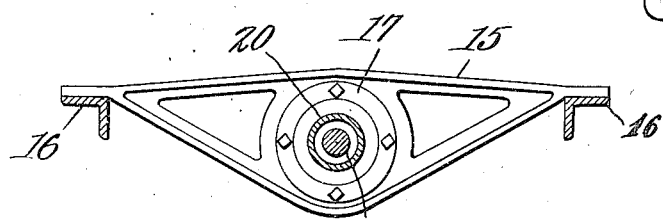

GUY S. DAVISON, OF HOLDERNESS, NEW HAMPSHIRE.

MOTOR-VEHICLE EXTENSION DRIVE-SHAFT.

1,163,643.  Specification of Letters Patent.  Patented Dec. 14, 1915.

Application filed April 14, 1915. Serial No. 21,299. REISSUED

*To all whom it may concern:*

Be it known that I, GUY S. DAVISON, citizen of the United States, residing at Holderness, in the county of Grafton and State of New Hampshire, have invented certain new and useful Improvements in Motor-Vehicle Extension Drive-Shafts, of which the following is a specification.

This invention relates to the drive shaft of automobiles and other motor vehicles, and its object is to provide an extension shaft by means of which the wheel base of the car may be lengthened, thus enabling a small car to be changed to a truck or other large commercial car.

The invention also has for its object to provide a structure which enables the change to be readily made, and without altering the structure of the car.

The objects stated are attained by means of a novel combination and arrangement of parts to be hereinafter described and claimed and in order that the invention may be better understood, reference is had to the accompanying drawing in which—

Figure 1 is a side elevation of the invention, partly in section; Fig. 2 is a plan view, and Fig. 3 is a cross-section on the line 3—3 of Fig. 2.

Referring specifically to the drawing, 5 denotes the drive shaft of the car, the same being operatively connected at its rear end, through the usual differential driving gear, to the rear axle of the car. Ordinarily, the shaft 5 is directly connected to the shaft 6 of the change-speed transmission gearing, but as it is the object of the invention to lengthen the wheel base of the machine, there has been interposed between the shafts 5 and 6 an extension shaft 7, the length of the latter corresponding to the desired increase in the length of the wheel base. The rear end of this extension shaft is connected by a universal joint 8 to the shaft 5, and its forward end is connected by a universal joint 9 to the shaft 6. The motion of the shaft 6 is therefore transmitted to the shaft 5 through the extension shaft 7.

The extension shaft 7 is housed in a tube 10 having at its forward end a bearing 11 which supports the corresponding end of said shaft. This end of the tube also has a globular enlargement 12 in which is housed the universal joint 9. The bearing 11 is provided with a grease cup 13. A sleeve 14 encircling the housing 12 secures the forward end of the tube to the transmission case, the sleeve being bolted to said case.

The rear end of the tube 10 is supported by a hanger 15 extending transversely between the side bars 16 of the car frame and bolted or otherwise secured thereto. The hanger has, midway between its ends, an opening in which seats and is secured a coupling member 17 which is dished to fit in the opening and has on one side a tubular extension 18 extending into the rear end of the tube 10 and serving as a support for the tube and a bearing for the rear end of the shaft 7. This bearing is also provided with a grease cup 19. The member 17 is bolted or otherwise rigidly fastened to the hanger, the wall of the opening in the latter being beveled so that said member may fit snugly therein. The usual tubular housing 20 of the shaft 5 is retained and connected at its forward end to the member 17, said end of the housing, in conjunction with the member 17, forming a housing which incloses the universal joint 8.

The extension shaft 7 can be readily applied to the car after disconnecting the shafts 5 and 6, and moving the former, with the rear axle, rearward according to the length of the extension shaft. The drawing shows the invention applied to a "Ford" car, but it is applicable with equal facility to other makes of cars.

I claim:—

1. The combination with the transmission and the drive shafts of a motor vehicle; of an extension shaft interposed between said shafts, to the respective ends of which extension shaft the transmission and the drive shafts are flexibly connected, a tube inclosing the extension shaft and having a globular enlargement at one end in which is housed the flexible connection between said shaft and the transmission shaft, means for fastening said end of the tube to the transmission case, a transverse hanger carried by the frame of the vehicle and having an opening, and a dished member secured in said opening and having a tubular extension seating in the rear end of the tube, said extension also having a bearing for the extension shaft.

2. The combination with the transmission and the drive shafts of a motor vehicle; of an extension shaft interposed between said shafts, to the respective ends of which extension shaft the transmission and the drive shafts are flexibly connected, a tube inclosing the extension shaft and having a globular enlargement at one end in which is housed the flexible connection between said shaft and the transmission shaft, means for fastening said end of the tube to the transmission case, a transverse hanger carried by the frame of the vehicle and having an opening, a dished member secured in said opening and having a tubular extension seating in the rear end of the tube, said extension also having a bearing for the extension shaft, and a tubular housing inclosing the drive shaft and having a housing part operating in conjunction with the aforesaid dished member to inclose the flexible connection between the drive shaft and the extension shaft.

In testimony whereof I affix my signature in presence of two witnesses.

GUY S. DAVISON.

Witnesses:
FRED L. PERKINS,
GEORGE G. AVERY.